United States Patent
Hosaka et al.

(10) Patent No.: US 9,843,039 B2
(45) Date of Patent: Dec. 12, 2017

(54) NEGATIVE ELECTRODE ACTIVE MATERIAL FOR LITHIUM ION SECONDARY BATTERY, NEGATIVE ELECTRODE FOR LITHIUM ION SECONDARY BATTERY, AND LITHIUM ION SECONDARY BATTERY

(71) Applicant: TDK CORPORATION, Tokyo (JP)

(72) Inventors: Nobuyuki Hosaka, Tokyo (JP); Atsushi Sano, Tokyo (JP)

(73) Assignee: TDK CORPORATION, Tokyo (JP)

(*) Notice: Subject to any disclaimer, the term of this patent is extended or adjusted under 35 U.S.C. 154(b) by 1 day.

(21) Appl. No.: 14/535,390

(22) Filed: Nov. 7, 2014

(65) Prior Publication Data

US 2015/0125744 A1 May 7, 2015

(30) Foreign Application Priority Data

Nov. 7, 2013 (JP) .................. 2013-231183

(51) Int. Cl.
*H01M 4/62* (2006.01)
*H01M 4/134* (2010.01)
*H01M 4/13* (2010.01)
*H01M 4/38* (2006.01)
*H01M 4/485* (2010.01)
*H01M 10/0525* (2010.01)
*H01M 4/36* (2006.01)

(52) U.S. Cl.
CPC .......... *H01M 4/386* (2013.01); *H01M 4/485* (2013.01); *H01M 4/622* (2013.01); *H01M 4/366* (2013.01); *H01M 10/0525* (2013.01)

(58) Field of Classification Search
CPC ...... H01M 4/485; H01M 4/622; H01M 4/366; H01M 4/386; H01M 10/0525
USPC ............................................... 429/209–218.1
See application file for complete search history.

(56) References Cited

U.S. PATENT DOCUMENTS

| 2004/0029014 A1* | 2/2004 | Hwang ............... H01M 4/04 429/246 |
| 2004/0202706 A1 | 10/2004 | Koo et al. |
| 2005/0191556 A1 | 9/2005 | Kim et al. |
| 2007/0026313 A1 | 2/2007 | Sano |

(Continued)

FOREIGN PATENT DOCUMENTS

| CN | 1747703 A | 3/2006 |
| CN | 105283984 A | 1/2016 |

(Continued)

*Primary Examiner* — Osei Amponsah
(74) *Attorney, Agent, or Firm* — Oliff PLC

(57) ABSTRACT

An object of the present invention is to provide a negative electrode for a lithium ion secondary battery with the excellent high-temperature cycle characteristic, and a lithium ion secondary battery including the same. In the negative electrode active material for a lithium ion secondary battery according to the present invention, a surface of a negative electrode active material including silicon or silicon oxide is coated with a polymer compound, and the polymer compound includes a polyacrylic acid derivative whose carboxyl groups at ends of side chains are cross-linked with a divalent metal cation ($Mg^{2+}$, $Ca^{2+}$, $Sr^{2+}$, $Ba^{2+}$, $Co^{2+}$, $Ni^{2+}$, $Cu^{2+}$, or $Zn^{2+}$).

11 Claims, 1 Drawing Sheet

(56) References Cited

U.S. PATENT DOCUMENTS

| | | |
|---|---|---|
| 2009/0136845 A1 | 5/2009 | Choi et al. |
| 2010/0203107 A1 | 8/2010 | Koo et al. |
| 2012/0070737 A1 | 3/2012 | Son et al. |
| 2012/0183852 A1* | 7/2012 | Kim .................. H01M 4/0416 |
| | | 429/212 |
| 2013/0089776 A1 | 4/2013 | Wata et al. |
| 2013/0115268 A1 | 5/2013 | Koo et al. |
| 2016/0141626 A1 | 5/2016 | Hosaka et al. |

FOREIGN PATENT DOCUMENTS

| | | | | |
|---|---|---|---|---|
| JP | H8-306353 A | | 11/1996 | |
| JP | 2000-348730 A | | 12/2000 | |
| JP | 2005-197258 A | | 7/2005 | |
| JP | 2009-176703 | * | 8/2009 | ............. H01M 4/02 |
| JP | 2010-129363 A | | 6/2010 | |

\* cited by examiner

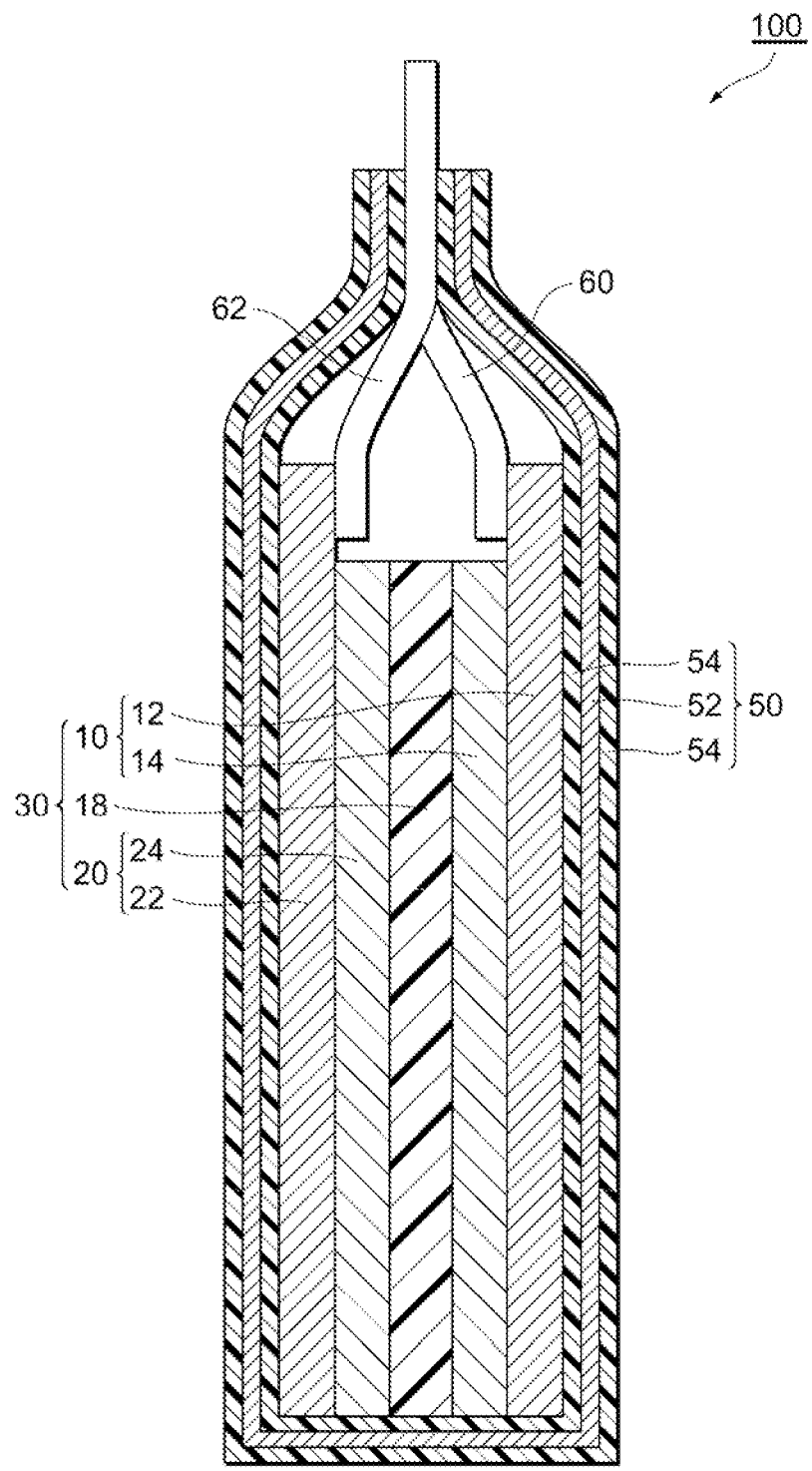

NEGATIVE ELECTRODE ACTIVE MATERIAL FOR LITHIUM ION SECONDARY BATTERY, NEGATIVE ELECTRODE FOR LITHIUM ION SECONDARY BATTERY, AND LITHIUM ION SECONDARY BATTERY

TECHNICAL FIELD

The present invention relates to a negative electrode active material for a lithium ion secondary battery, a negative electrode for a lithium ion secondary battery, and a lithium ion secondary battery.

BACKGROUND ART

Lithium ion secondary batteries are lighter in weight and have higher capacity than nickel-cadmium batteries, nickel metal hydride batteries, etc.; therefore, the lithium ion secondary batteries have widely been used as the power source for portable electronic appliances. Moreover, the lithium ion secondary batteries are the strong candidate for the on-vehicle power source used for hybrid vehicles or electric vehicles. In recent years, with the size reduction and the increase in functionality of the portable electronic appliances, the lithium ion secondary batteries used for the power source thereof has been anticipated to have higher capacity.

In view of this, an alloy-based negative electrode material including silicon or silicon oxide has attracted attention recently. Silicon is capable of electrochemical intercalation and deintercalation of lithium ions, and enables charging/discharging of much higher capacity than graphite. In particular, it has been known that silicon has a theoretical discharge capacity of 4210 mAh/g, which is approximately 11 times as high as that of graphite.

In general, the potential of the negative electrode active material is decreased during the charging and the side reaction of reducing and decomposing the electrolyte occurs. In this case, a film containing Li from the decomposition product of the electrolyte or the gas such as carbon dioxide or hydrogen is formed on a surface of the negative electrode active material. The generated gas increases the internal resistance of the lithium ion secondary battery and the lithium in the film no longer contributes to the charging/discharging; therefore, the discharge capacity decreases and the irreversible capacity is increased. By the formation of this film, the reaction between the electrolyte and the negative electrode active material during the charging is relieved and the lithium ion secondary battery is thus stabilized. The excessive growth of the film, however, is not preferable because the internal resistance is increased.

In the case of using silicon or silicon oxide for the negative electrode active material, silicon or silicon oxide is reduced in size in the charging/discharging cycle and the surface not provided with the film is formed in the charging/discharging cycle; in this case, it is difficult to stabilize the lithium ion secondary battery and the side reaction with the electrolyte easily continues in the charging/discharging cycle.

For suppressing the side reaction between the negative electrode active material and the electrolyte and improving the cycle characteristic, it has been suggested to coat the surface of the negative electrode active material of a lithium ion secondary battery containing a carbon material with a polymer film containing the alkali metal salt (for example, Patent Document 1) and to coat a silicon material with a polymer film or the like (for example, Patent Document 2).

CITATION LIST

Patent Literatures

Patent Document 1: JP-A-H-8-306353
Patent Document 2: JP-A-2005-197258

On the other hand, in a high-temperature cycle of 60° C. or higher, the reactivity of the electrolyte becomes extremely high; therefore, the side reaction that occurs in the charging/discharging cycle becomes very active and the lithium ion secondary battery tends to be adversely affected more largely.

The lithium ion secondary battery may be exposed to high temperatures such as when the battery is used as the on-vehicle power source; therefore, the improvement of the high-temperature cycle characteristic is essential.

However, the technique in which the negative electrode active material is coated with the polymer film as above cannot provide the sufficient high-temperature cycle characteristic because when the lithium ion secondary battery has high temperature due to heating from the outside, the side reaction between the electrolyte and the silicon particles having intercalated the lithium becomes very active to promote the gas generation or the film formation.

SUMMARY OF THE INVENTION

Problem to be Solved by the Invention

An object of the present invention is to provide a negative electrode for a lithium ion secondary battery with the excellent high-temperature cycle characteristic and a lithium ion secondary battery including the negative electrode.

Solution to the Problems

In a negative electrode active material for a lithium ion secondary battery according to the present invention made for solving the above problem, a surface of silicon or silicon oxide included in the negative electrode active material is coated with a polymer compound and the polymer compound is a polyacrylic acid derivative whose carboxyl groups at ends of side chains are cross-linked with a divalent metal cation.

According to the negative electrode active material for a lithium ion secondary battery according to the present invention, the surface of the negative electrode active material is coated with the polyacrylic acid derivative whose carboxyl groups at the ends of the side chains are cross-linked with a divalent metal cation, whereby the reaction between the negative electrode active material and the electrolyte and the gas generation in the charging/discharging cycle can be suppressed and the deterioration due to the charging/discharging cycle can be suppressed.

It is considered that this is because the acrylic acid derivative cross-linked with the divalent metal cation is chemically stable and therefore, even in the high-temperature cycle where the electrolyte easily becomes active, the reaction between the electrolyte and the negative electrode active material can be suppressed and the decomposition of the electrolyte or the gas generation can be suppressed. As a result, the excellent high-temperature cycle characteristic can be obtained.

As the divalent metal cation included in the polymer compound of the negative electrode active material for a lithium ion secondary battery according to the present invention, one or more is preferably selected from among $Mg^{2+}$, $Ca^{2+}$, $Sr^{2+}$, $Ba^{2+}$, $Co^{2+}$, $Ni^{2+}$, $Cu^{2+}$, and $Zn^{2+}$.

Thus, the polyacrylic acid derivative cross-linked with one or more divalent metal cations selected from among $Mg^{2+}$, $Ca^{2+}$, $Sr^{2+}$, $Ba^{2+}$, $Co^{2+}$, $Ni^{2+}$, $Cu^{2+}$, and $Zn^{2+}$, has high binding property and high mechanical strength. This makes it possible to follow the large expansion and shrinkage of silicon or silicon oxide, thereby suppressing the exfoliation of the polymer compound from the surface of the negative electrode active material. Although the charging and discharging reduces the size of silicon or silicon oxide to induce the cycle deterioration, the present invention can suppress the deterioration in high-temperature cycle characteristic caused by this size reduction.

The divalent metal cation included in the polymer compound of the negative electrode active material for a lithium ion secondary battery according to the present invention is more preferably $Mg^{2+}$ or $Ca^{2+}$.

This improves the chemical stability under high temperatures and enables the stable charging and discharging even in a high-temperature state, whereby the excellent high-temperature cycle characteristic can be obtained.

In the negative electrode active material for a lithium ion secondary battery according to the present invention, the polymer compound is preferably contained by 0.1 to 5 wt % relative to the negative electrode active material.

This facilitates the coating of the entire surface of the negative electrode active material, and suitably suppresses the reaction between the negative electrode active material and the electrolyte.

The thickness of the coating of the polymer compound in the negative electrode active material for a lithium ion secondary battery according to the present invention is preferably 10 to 500 nm.

Thus, the effect of relieving the stress in the negative electrode active material layer that is generated due to the expansion of the negative electrode active material during the charging is increased and the high-temperature cycle characteristic can be further improved.

A negative electrode for a lithium ion secondary battery according to the present invention preferably includes the aforementioned negative electrode active material for a lithium ion secondary battery.

This can improve the high-temperature cycle characteristic of the negative electrode for a lithium ion secondary battery.

A lithium ion secondary battery according to the present invention preferably includes the aforementioned negative electrode for a lithium ion secondary battery.

This can improve the high-temperature cycle characteristic of the lithium ion secondary battery.

Effects of the Invention

According to the present invention, the negative electrode active material for a lithium ion secondary battery, the negative electrode for a lithium ion secondary battery, and the lithium ion secondary battery with the excellent high-temperature cycle characteristic can be provided.

BRIEF DESCRIPTION OF THE DRAWINGS

FIG. 1 is a sectional diagram illustrating a structure of a lithium ion secondary battery.

DESCRIPTION OF EMBODIMENTS

A preferred embodiment of the present invention is described hereinafter with reference to the drawing. The present invention, however, is not limited to the embodiment below. The components described below include the component that can easily be conceived by a person skilled in the art and the component that is substantially the same. Further, the components described below can be combined as appropriate.

<Lithium Ion Secondary Battery>

FIG. 1 is a structure sectional diagram of a lithium ion secondary battery 100. The lithium ion secondary battery 100 in FIG. 1 includes: an exterior body 50; an electrode body 30 formed by stacking a positive electrode 10 and a negative electrode for a lithium ion secondary battery (hereinafter, "negative electrode") 20 which are provided inside the exterior body with a separator 18 held therebetween; and an electrolyte including an electrolyte salt. The separator 18 holds the electrolyte serving as a medium of moving lithium ions between the positive and negative electrodes 10 and 20 during the charging and discharging.

The shape of the lithium ion secondary battery is not particularly limited; for example, a cylindrical shape, a rectangular shape, a coin-like shape, a flat shape, a laminated film shape, or the like is applicable. In the present invention, a laminated film is employed as the exterior body 50 and a laminated film type battery is manufactured and evaluated in the examples below. The laminated film is formed as, for example, a three-layer structure in which polypropylene, aluminum, and nylon are stacked in this order.

<Positive Electrode for Lithium Ion Secondary Battery>

In the positive electrode 10, a positive electrode active material layer 14 including a positive electrode active material intercalating/deintercalating lithium ions, a binder for a positive electrode, and a conductive auxiliary agent is provided on at least one main surface of a positive electrode current collector 12. In the negative electrode 20, a negative electrode active material layer 24 including a negative electrode active material intercalating/deintercalating lithium ions, a conductive auxiliary agent, and a binder is provided on at least one main surface of a negative electrode current collector 22.

(Positive Electrode Active Material)

As the positive electrode active material, an oxide or a sulfide that can intercalate or deintercalate lithium ions is given, and one or two or more kinds thereof are used. Specifically, a metal sulfide and a metal oxide not containing lithium, and a lithium composite oxide containing lithium are given.

Specific examples include lithium cobaltate ($LiCoO_2$), lithium nickelate ($LiNiO_2$), lithium manganese spinel ($LiMn_2O_4$), a composite metal oxide represented by general formula: $LiNi_xCo_yMn_zO_2$ (x+y+z=1), a composite metal oxide such as lithium vanadium compound ($LiV_2O_5$) or olivine type $LiMePO_4$ (where Me represents Co, Ni, Mn, Fe, V, or VO).

(Binder for Positive Electrode)

The binder for a positive electrode is added for the purpose of maintaining the electrode structure by bringing the members in the positive electrode active material layer 14 in close contact with each other or bringing the positive electrode active material layer 14 and the positive electrode current collector 12 in close contact with each other. As the binder included in the positive electrode 10 for a lithium ion secondary battery, fluorine-based polymer such as polyvinylidene fluoride is particularly preferable because this polymer is uneasily soluble to the electrolyte and has excellent oxidation resistance.

(Positive Electrode Current Collector)

The positive electrode current collector 12 is formed of a conductive material, and has one surface or both surfaces provided with the positive electrode active material layer 14. In the lithium ion secondary battery of this embodiment, a metal foil of aluminum, stainless steel, nickel, titanium, or an alloy containing any of these can be used as the positive electrode current collector 12 used as the positive electrode 10, and an aluminum foil is preferably used for the positive electrode current collector 12.

(Conductive Auxiliary Agent)

In the positive electrode active material layer 14 and the negative electrode active material layer 24, a conductive auxiliary agent may be added for the purpose of improving the conductivity. The conductive auxiliary agent used in this embodiment is not particularly limited and a well-known material can be used. For example, carbon black such as acetylene black, furnace black, channel black, or thermal black, carbon fiber such as vapor grown carbon fiber (VGCF) or carbon nanotube, and a carbon material such as graphite are given, and one or two or more of these can be used.

(Electrolyte)

As the electrolyte, a solution in which a lithium salt is dissolved in a non-aqueous solvent (organic solvent) can be used. Examples of the lithium salt include $LiPF_6$, $LiClO_4$, $LiBF_4$, $LiAsF_6$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. One kind of those salts may be used alone or two or more kinds thereof may be used in combination.

Preferable examples of the organic solvent include propylene carbonate, ethylene carbonate, fluoroethylene carbonate, diethyl carbonate, dimethyl carbonate, methylethyl carbonate and the like. One kind of those solvents may be used alone or two or more kinds thereof may be mixed at any proportion. As the organic solvent, a mixture of a cyclic carbonate and a chain carbonate is preferably used; from the viewpoint of the balance between the discharge capacity and the cycle characteristic, at least two kinds of fluoroethylene carbonate and diethyl carbonate are preferably contained.

(Separator)

The separator 18 may be formed of an electrically insulating porous structure. For example, a single-layer body or a multilayer body including a film of polyethylene, polypropylene, or polyolefin, a film formed by extending a mixture of the above resins, and fibrous nonwovens including at least one material selected from cellulose, polyester, and polypropylene are given.

<Negative Electrode for Lithium Ion Secondary Battery>

The negative electrode 20 used for a lithium ion secondary battery includes the negative electrode active material coated with the polymer compound, a binder for the negative electrode, and the negative electrode current collector 22.

(Binder for Negative Electrode)

The binder for the negative electrode is added for the purpose of maintaining the electrode structure by bringing the members in the negative electrode active material layer 24 in close contact with each other or bringing the negative electrode active material layer 24 and the negative electrode current collector 22 in close contact with each other. As the binder included in the negative electrode 20 for a lithium ion secondary battery, polyimide, polyamide, polyamideimide, polyacrylonitrile, polyalginic acid, polyacrylic acid, or the like can be used. Any of these can be used alone or mixed with another at any proportion.

(Negative Electrode Current Collector)

The negative electrode current collector 22 is formed of a conductive material, and has one main surface or both surfaces provided with the negative electrode active material layer 24. In the negative electrode for a lithium ion secondary battery of this embodiment, the material of the negative electrode current collector 22 is not particularly limited; for example, a metal foil of copper, stainless steel, nickel, titanium, or an alloy containing any of these can be used as the negative electrode current collector 22 used for the negative electrode 20. In particular, copper and the copper alloy are preferably used and an electrolytic copper foil or a rolled copper foil is preferably used.

<Negative Electrode Active Material for Lithium Ion Secondary Battery>

The negative electrode active material for a lithium ion secondary battery is the negative electrode active material including silicon or silicon oxide, and the surface of the negative electrode active material is coated with the polymer compound. This negative electrode active material is used for a negative electrode for a lithium ion secondary battery and a lithium ion secondary battery including the same.

(Negative Electrode Active Material)

By including silicon or silicon oxide as the negative electrode active material, the negative electrode 20 can have high energy density. Silicon may be contained alone or as a compound or in a state that two or more kinds thereof are mixed.

Examples of the silicon compound include an alloy, a nitride compound, and a carbide compound. Specifically, $SiB_4$, $SiB_6$, $Mg_2Si$, $Ni_2Si$, $TiSi_2$, $MoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, LiSiO, and the like are given.

Silicon oxide is $SiO_x$ ($0<x\leq2$) and any oxidation number can be selected. Silicon oxide may be contained alone, or may be contained in a state that silicon oxide is composited with silicon, the silicon alloy, or the silicon compound.

The negative electrode active material may be used in combination with another negative electrode active material that intercalates/deintercalates lithium ions other than silicon or silicon oxide. For example, graphite, soft carbon, hard carbon, $TiO_2$, $Li_4Ti_5O_{12}$, $Fe_2O_3$, SnO and the like are given.

(Polymer Compound)

Polyacrylic acid is known as the excellent binder because of having high adhesion with the negative electrode active material. The divalent metal cation cross-links between the carboxyl groups of the polyacrylic acid to produce the rubber-like state; thus, while the adhesive property is maintained, the mechanical strength, the elasticity, the heat resistance and the solvent resistance are improved. Moreover, by changing the structure of the carboxyl group, which is the cause of generating gas in the use as the member for the lithium ion secondary battery, the operation of suppressing gas generation is obtained.

As an example of the structure formula of the polyacrylic acid cross-linked with the divalent metal cation, Structure Formula 1 is shown below.

[Chemical Formula 1]

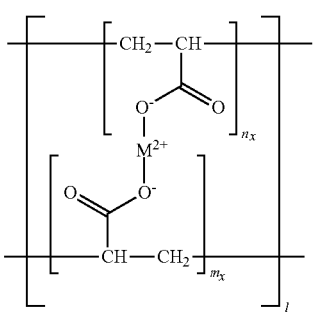

(Structure Formula 1)
(Where M in Structure Formula 1 represents a divalent metal cation and $n_x$, $m_x$ (x is a positive integer), and l express the polymerization degree).

The polymerization degrees $n_x$, $m_x$ and l in Structure Formula 1 are not limited in particular as long as they are positive integers. When $n_x$ or $m_x$ is 2 or more, the structure other than the cross-linking portion represented by —O$^-$—M$^{2+}$—O$^-$— in Structure Formula 1 in the repeated structure represented by the polymerization degree l corresponds to the acrylic acid structure with the carboxyl group.

Note that in Structure Formula 1, for sake of simplicity, the polymer is expressed by using 1 for clarifying that a plurality of repetitions exists in the structure formula. In fact, instead of the repetition of one unit structure, the structure cross-linked with the divalent metal cation as expressed in the structure formula 1 may be provided in part of the polyacrylic acid.

The negative electrode active material is coated with the polymer compound including the polyacrylic acid derivative cross-linked with the divalent metal cation. Since the polyacrylic acid derivative cross-linked with the divalent metal cation is chemically stable, the reaction between the electrolyte and the active material is suppressed even under the high-temperature cycle, where the electrolyte easily becomes active, whereby the reductive decomposition of the electrolyte and the gas generation can be suppressed. This can prevent the direct contact between the surface of the negative electrode active material and the electrolyte, whereby the side reaction can be suppressed and the high-temperature cycle characteristic can be improved.

Moreover, if silicon or the silicon compound is used for the negative electrode active material, the expansion and shrinkage of the electrode caused by the intercalation and deintercalation of lithium ions due to the charging and discharging are more remarkably observed than in the case of using graphite, which is generally employed as the negative electrode active material. Therefore, in the lithium ion secondary battery whose negative electrode active material is formed using the alloy-based negative electrode material including silicon or the like in which the surface of the negative electrode active material is coated with the polymer film or the like according to the conventional technique, the polymer film formed on the negative electrode material surface is easily exfoliated in the charging/discharging cycle due to the expansion and shrinkage of the negative electrode active material; thus, it is difficult to maintain the effect that suppresses the side reaction between the negative electrode active material surface and the electrolyte. In particular, the elasticity of the polymer tends to decrease in the high-temperature cycle; in this case, the polymer film is easily exfoliated and the deterioration in high-temperature cycle characteristic is remarkable.

The weight-average molecular weight of the polymer compound is preferably 200,000 or more.

When the polymer compound has a weight-average molecular weight of 200,000 or more, the polymer compound has the high binding property and the more firm three-dimensional bonding network. Therefore, the excellent mechanical strength and elasticity are secured even in the high-temperature cycle and it is possible to follow the large expansion and shrinkage of silicon or silicon oxide. Accordingly, the stable state which uneasily causes change in the coating can be maintained for a long time.

Silicon or silicon oxide is reduced in size due to the charging/discharging cycle, and a new surface not provided with the film is formed along with the size reduction. The newly formed surface has low potential and is not provided with the coating; therefore, a new film is easily formed thereon. In particular, the reaction between the electrolyte and the new surface of the silicon-based negative electrode active material easily occurs in the high-temperature cycle, in which case the deterioration easily occurs.

By coating the silicon-based negative electrode active material with the polyacrylic acid derivative cross-linked with the divalent metal cation, the exposure of the new surface is suppressed and the side reaction caused by the contact between the electrolyte and the new surface of the silicon active material can be suppressed.

The polymer compound is preferably contained by 0.1 to 5 wt % relative to the negative electrode active material. As long as the surface of the negative electrode active material is coated with the polymer compound even partially, the contact area with the electrolyte can be reduced; therefore, the side reaction can be suppressed. However, in the best mode, the active material surface is preferably coated uniformly and entirely. With the coating amount in this range, the entire surface of the negative electrode active material tends to be coated, which is preferable because the reaction between the negative electrode active material and the electrolyte can be suppressed further.

The film thickness of the polymer compound film is preferably 10 to 500 nm.

The change in state uneasily occurs in the negative electrode of the lithium ion secondary battery which employs the negative electrode active material coated with the polyacrylic acid derivative cross-linked with the divalent metal cation with a film thickness of 10 to 500 nm. If the film thickness of the polymer compound is 10 nm or more, the effect of relieving the stress in the negative electrode active material layer that is generated due to the expansion of the negative electrode active material during the charging is improved, whereby the high-temperature cycle characteristic can be improved.

The shape of the coating of the polymer compound is not particularly limited as long as the polymer compound has the film thickness in the above range; for example, a spherical shape, a needle-like shape, a fibrous shape, a cloud-like shape, and a petaloid shape are given as the shape of the polymer compound.

When the polymer compound film has unevenness, the effect of relieving the stress of the negative electrode active material layer 24 is improved further and the high-temperature cycle characteristic can be improved.

The polymer compound of the negative electrode active material for a lithium ion secondary battery is identified by analyzing the surface and section of the negative electrode active material for a lithium ion secondary battery and the negative electrode for a lithium ion secondary battery based on microscopic Raman spectrometry.

Moreover, for observing the coating state, the dark-field scanning transmission electron microscopy (ADF-STEM) and the energy dispersive X-ray spectroscopy (EDS-STEM) are effective.

Moreover, for knowing the coating amount, it is effective to check the weight change through the thermal gravimetric analysis/differential thermal analysis (TG-DTA).

<Manufacturing Method for Negative Electrode Active Material for Lithium Ion Secondary Battery>

The negative electrode active material for a lithium ion secondary battery can be manufactured as below.

First, a dispersion solution in which the above-mentioned negative electrode active material is dispersed in a polyacrylic acid aqueous solution whose concentration has been adjusted to be predetermined concentration is manufactured. Next, using this dispersion solution, the negative electrode active material coated with powder polyacrylic acid is manufactured according to a spray drying method. The obtained material is immersed in a $MCl_2$ or $M(OH)_2$ (M: Mg, Ca, Sr, Ba, Co, Ni, Cu, or Zn) aqueous solution whose concentration has been adjusted to be the predetermined concentration, and then a chemical reaction occurs in which the carboxyl groups at the end of the side chain of the polyacrylic acid are cross-linked with $Mg^{2+}$, $Ca^{2+}$, $Sr^{2+}$, $Ba^{2+}$, $Co^{2+}$, $Ni^{2+}$, $Cu^{2+}$, or $Zn^{2+}$. Thus, the polyacrylic acid coating the negative electrode active material can be made into the polyacrylic acid derivative cross-linked with the divalent metal cation. After the solution is stirred well, the solution was filtered and the residue is dried. Thus, the negative electrode active material coated with the polyacrylic acid derivative cross-linked with the divalent metal cation can be obtained.

<Manufacturing Method for Negative Electrode for Lithium Ion Secondary Battery>

First, the negative electrode 20 can be manufactured as below. For example, the negative electrode active material coated with the above-mentioned polymer compound, the conductive auxiliary agent, and the binder are mixed and dispersed in a solvent such as water or N-methyl-2-pyrolidone to manufacture the paste of negative electrode slurry. Next, this negative electrode slurry with predetermined thickness is applied on one surface or both surfaces of the negative electrode current collector 22 such as a copper foil using, for example, a comma roll coater, and the solvent is vaporized in a drying furnace. If the slurry is applied to the both surfaces of the negative electrode current collector 22, the thickness of the coating film to serve as the negative electrode active material layer 24 is desirably the same on the both surfaces. The negative electrode 20 provided with the negative electrode active material is pressed by a roll pressing machine so that the negative electrode active material layer 24 is compressively bonded with one surface or the both surfaces of the negative electrode current collector 22, whereby the adhesion between the negative electrode current collector 22 and the negative electrode active material layer 24 on the negative electrode current collector 22 is increased and a negative electrode sheet with predetermined density is obtained.

The negative electrode sheet is punched into a predetermined electrode size using an electrode die, thereby manufacturing the negative electrode 20 for a lithium ion secondary battery of this embodiment. The area of the negative electrode 20 is preferably larger than the area of the positive electrode 10. When the negative electrode 20 is larger than the opposite positive electrode 10, the internal short-circuiting due to the separation of lithium is less likely to occur.

<Manufacturing Method for Lithium Ion Secondary Battery>

The lithium ion secondary battery 100 of this embodiment can be manufactured as below, for example.

The positive electrode 10 can be manufactured as described below. For example, the above-mentioned positive electrode active material, the conductive auxiliary agent, and the binder are mixed and dispersed in a solvent such as N-methyl-2-pyrolidone, thereby manufacturing the paste of positive electrode slurry. Next, this positive electrode slurry is applied on one surface or both surfaces of the positive electrode current collector 12 such as an aluminum foil using, for example, a comma roll coater to form the positive electrode active material layer 14 with predetermined thickness, and the solvent is vaporized in a drying furnace. If the slurry is applied to the both surfaces of the positive electrode current collector 12, the thickness of the coating film to serve as the positive electrode active material layer 14 is desirably the same on each surface.

The positive electrode 10 provided with the positive electrode active material layer 14 is pressed by a roll pressing machine so that the positive electrode active material layer 14 is compressively bonded with one surface or the both surfaces of the positive electrode current collector 12, whereby the adhesion between the positive electrode current collector 12 and the positive electrode active material layer 14 is increased and a positive electrode sheet with predetermined density is obtained.

The positive electrode sheet is punched into a predetermined electrode size using an electrode die, thereby manufacturing the positive electrode 10 for a lithium ion secondary battery of this embodiment. As already described, the area of the positive electrode 10 is preferably smaller than the area of the negative electrode 20. When the positive electrode 10 is a little smaller than the opposite negative electrode 20, the internal short-circuiting due to the separation of lithium can be prevented easily.

Next, an electrode body 30 can be manufactured by stacking the above-mentioned negative electrode 20 and positive electrode 10 with a separator 18 interposed therebetween. This electrode body is considered as one layer, and an electrode body with any number of such layers stacked can be manufactured according to the similar manufacturing method. For avoiding the direct contact between the negative electrode 20 and the positive electrode 10, a separator punched using an electrode die to have a size larger than both electrodes can be suitably used as the separator 18.

Next, a negative electrode lead 62 made of nickel is attached to an end of a projection of the copper foil, where the negative electrode active material layer 24 is not provided, in the negative electrode 20 of the electrode body 30; on the other hand, a positive electrode lead 60 made of aluminum is attached to an end of a projection of the aluminum foil, where the positive electrode active material layer 14 is not provided, in the positive electrode 10 of the electrode body 30 using an ultrasonic welder. This electrode body 30 is inserted into the exterior body 50 of the aluminum laminated film, and the body 50 is heat sealed to form a closed portion except one portion on the periphery. Then, a predetermined amount of electrolyte is poured into the exterior body 50 and then the one portion of the body 50 is heat sealed while the pressure is reduced. Thus, the lithium ion secondary battery 100 can be obtained.

When the lithium ion secondary battery 100 is charged, for example, lithium ions are deintercalated from the positive electrode active material layer 14 and intercalated into the negative electrode active material layer 24 through the electrolyte. When the lithium ion secondary battery 100 is discharged, for example, lithium ions are deintercalated from the negative electrode active material layer 24 and intercalated into the positive electrode active material layer 14 through the electrolyte. In this manner, the lithium ion secondary battery 100 can store the electric capacity.

The embodiment has been described in detail; however, the present invention is not limited to the above embodiment and various modifications are possible. For example, in the embodiment, the lithium ion secondary battery has the laminated film structure; however, the present invention can be similarly applied to the lithium ion secondary battery with a structure in which the positive electrode and the negative electrode are folded or stacked. Furthermore, the present invention can be applied to the lithium ion secondary battery with a coin-like shape, a rectangular shape, or a flat shape.

EXAMPLES

Example 1

<Manufacture of Negative Electrode Active Material for Lithium Ion Secondary Battery>

First, a negative electrode active material containing graphite and SiO obtained by having $SiO_2$ subjected to the disproportionation reaction in a heat treatment of 1000° C. under reduced pressure at a weight ratio of 1:1 was prepared as the negative electrode active material. A dispersion solution was manufactured in which this negative electrode active material was dispersed in an aqueous solution containing 1.3 wt % of polyacrylic acid relative to the weight of the negative electrode active material. Next, using this dispersion solution, the negative electrode active material coated with powder polyacrylic acid was manufactured according to a spray drying method in which a spray drier was used in the Ar gas at 80° C. This material was immersed in the $MgCl_2$ aqueous solution adjusted to be 30 wt %, and the polyacrylic acid coating the negative electrode active material was made into the polyacrylic acid derivative cross-linked with $Mg^{2+}$. After this solution was stirred well, the solution was filtered and the residue was dried. Thus, the negative electrode active material for a lithium ion secondary battery coated with the polyacrylic acid derivative cross-linked with 1.5 wt % of $Mg^{2+}$ relative to the negative electrode active material was obtained.

<Manufacture of Negative Electrode for Lithium Ion Secondary Battery>

The paste of negative electrode slurry was manufactured by mixing and dispersing water, 80 wt % of the above negative electrode active material for a lithium ion secondary battery, 5 wt % of acetylene black as the conductive auxiliary agent, and 1.5 wt % of polyacrylic acid with an average molecular weight of 1,000,000 as the binder. The negative electrode slurry was applied uniformly with a predetermined thickness on both surfaces of a 10-μm-thick copper foil using a comma roll coater to form the negative electrode active material layer. Next, the negative electrode active material layer was dried under the atmosphere of 100° C. in a drying furnace. The thickness of the coating film of the negative electrode active material layer on each of the both surfaces of the copper foil was adjusted to be substantially the same. The negative electrode provided with the negative electrode active material was pressed by a roll pressing machine so that the negative electrode active material layer was compressively bonded with the both surfaces of a negative electrode current collector, whereby a negative electrode sheet with predetermined density was obtained.

The negative electrode sheet was punched into an electrode size of 21×31 mm using an electrode die, and then the sheet was dried with hot air in a thermal furnace, thereby manufacturing the negative electrode for a lithium ion secondary battery according to Example 1. The heat treatment was conducted in vacuum.

<Manufacture of Positive Electrode for Lithium Ion Secondary Battery>

The paste of positive electrode slurry was manufactured by mixing and dispersing 96 wt % of lithium cobaltate ($LiCoO_2$) as the positive electrode active material, 2 wt % of Ketjen black as the conductive auxiliary agent, 2 wt % of PVDF as the binder, and N-methyl-2-pyrolidone as the solvent. This positive electrode slurry was applied uniformly with predetermined thickness on the both surfaces of a 20-μm-thick aluminum foil using a comma roll coater to form a positive electrode active material layer. Next, the N-methyl-2-pyrolidone solvent was dried under the atmosphere of 110° C. in a drying furnace. The thickness of the coating film of the positive electrode active material layer applied on each of the both surfaces of the aluminum foil was adjusted to be substantially the same. The positive electrode provided with the positive electrode active material was pressed by a roll pressing machine so that the positive electrode active material layer was compressively bonded with the both surfaces of a positive electrode current collector, whereby a positive electrode sheet with predetermined density was obtained.

The positive electrode sheet was punched into an electrode size of 20×31 mm using an electrode die, thereby manufacturing the positive electrode for a lithium ion secondary battery.

<Manufacture of Lithium Ion Secondary Battery>

The manufactured negative electrode and positive electrode were stacked with a polypropylene separator with a thickness of 16 μm and a size of 22×33 mm interposed therebetween, thereby manufacturing an electrode body. Three negative electrodes and two positive electrodes were stacked alternately with a total of four separators interposed therebetween. In the negative electrode of the electrode body, a negative electrode lead made of nickel was attached using an ultrasonic welder to an end of a projection of the copper foil, where the negative electrode active material layer was not provided; on the other hand, a positive electrode lead made of aluminum was attached using an ultrasonic welder to an end of a projection of the aluminum foil, where the positive electrode active material layer was not provided, in the positive electrode of the electrode body. This electrode body was inserted into the exterior body of the aluminum laminated film, and the body was heat sealed to form a closed portion except one portion on the periphery. Then, an electrolyte in which 1 M (mol/L) of $LiPF_6$ was added as the lithium salt in a solvent containing FEC/DEC at 3:7 was poured into the exterior body, and after that, the one portion of the body was heat sealed while the pressure was reduced using a vacuum sealer. Thus, the lithium ion secondary battery according to Example 1 was obtained.

Example 2

In regard to a negative electrode for a lithium ion secondary battery and a lithium ion secondary battery according to Example 2, a dispersion solution was manufactured in which the negative electrode active material containing graphite and SiO obtained by the disproportionation reaction in a heat treatment of 1000° C. under the reduced pressure at a weight ratio of 1:1 was dispersed in an aqueous solution containing 0.04 wt % of polyacrylic acid relative to the weight of the negative electrode active material. Next, using this dispersion solution, the negative electrode active material coated with the powder polyacrylic acid was manufactured according to a spray drying method in which a spray drier was used in Ar gas at 80° C. Next, this material was immersed in a $CaCl_2$ aqueous solution adjusted to be 30 wt %, and the polyacrylic acid coating the negative electrode active material was made into the polyacrylic acid derivative cross-linked with $Ca^{2+}$. The negative electrode for a lithium ion secondary battery and the lithium ion secondary battery were manufactured in a manner similar to those of Example 1 except that after this solution was stirred well, the solution was filtered and the residue was dried to form the negative electrode active material coated with the polyacrylic acid derivative cross-linked with 0.05 wt % of $Ca_{2+}$ relative to the negative electrode active material.

Example 3

In regard to a negative electrode for a lithium ion secondary battery and a lithium ion secondary battery according to Example 3, a dispersion solution was manufactured in which the negative electrode active material containing graphite and SiO obtained by the disproportionation reaction in a heat treatment of 1000° C. under the reduced pressure at a weight ratio of 1:1 was dispersed in an aqueous solution containing 0.06 wt % of polyacrylic acid relative to the weight of the negative electrode active material. Next, using this dispersion solution, the negative electrode active material coated with the powder polyacrylic acid was manufactured according to a spray drying method in which a spray drier was used in Ar gas at 80° C. Next, this material was immersed in a $CaCl_2$ aqueous solution adjusted to be 30 wt %, and the polyacrylic acid coating the negative electrode active material was made into the polyacrylic acid derivative cross-linked with $Ca^{2+}$. The negative electrode for a lithium ion secondary battery and the lithium ion secondary battery were manufactured in a manner similar to those of Example 1 except that after this solution was stirred well, the solution was filtered and the residue was dried to form the negative electrode active material coated with the polyacrylic acid derivative cross-linked with 0.08 wt % of $Ca^{2+}$ relative to the negative electrode active material.

Example 4

In regard to a negative electrode for a lithium ion secondary battery and a lithium ion secondary battery according to Example 4, a dispersion solution was manufactured in which the negative electrode active material containing graphite and SiO obtained by the disproportionation reaction in a heat treatment of 1000° C. under the reduced pressure at a weight ratio of 1:1 was dispersed in an aqueous solution containing 0.08 wt % of polyacrylic acid relative to the weight of the negative electrode active material. Next, using this dispersion solution, the negative electrode active material coated with the powder polyacrylic acid was manufactured according to a spray drying method in which a spray drier was used in Ar gas at 80° C. Next, this material was immersed in a $CaCl_2$ aqueous solution adjusted to be 30 wt %, and the polyacrylic acid coating the negative electrode active material was made into the polyacrylic acid derivative cross-linked with $Ca^{2+}$. The negative electrode for a lithium ion secondary battery and the lithium ion secondary battery were manufactured in a manner similar to those of Example 1 except that after this solution was stirred well, the solution was filtered and the residue was dried to form the negative electrode active material coated with the polyacrylic acid derivative cross-linked with 0.1 wt % of $Ca^{2+}$ relative to the negative electrode active material.

Example 5

In regard to a negative electrode for a lithium ion secondary battery and a lithium ion secondary battery according to Example 5, a dispersion solution was manufactured in which the negative electrode active material containing graphite and SiO obtained by the disproportionation reaction in a heat treatment of 1000° C. under the reduced pressure at a weight ratio of 1:1 was dispersed in an aqueous solution containing 0.8 wt % of polyacrylic acid relative to the weight of the negative electrode active material. Next, using this dispersion solution, the negative electrode active material coated with the powder polyacrylic acid was manufactured according to a spray drying method in which a spray drier was used in Ar gas at 80° C. Next, this material was immersed in a $CaCl_2$ aqueous solution adjusted to be 30 wt %, and the polyacrylic acid coating the negative electrode active material was made into the polyacrylic acid derivative cross-linked with $Ca^{2+}$. The negative electrode for a lithium ion secondary battery and the lithium ion secondary battery were manufactured in a manner similar to those of Example 1 except that after this solution was stirred well, the solution was filtered and the residue was dried to form the negative electrode active material coated with the polyacrylic acid derivative cross-linked with 1 wt % of $Ca^{2+}$ relative to the negative electrode active material.

Example 6

In regard to a negative electrode for a lithium ion secondary battery and a lithium ion secondary battery according to Example 6, a dispersion solution was manufactured in which the negative electrode active material containing graphite and SiO obtained by the disproportionation reaction in a heat treatment of 1000° C. under the reduced pressure at a weight ratio of 1:1 was dispersed in an aqueous solution containing 4 wt % of polyacrylic acid relative to the weight of the negative electrode active material. Next, using this dispersion solution, the negative electrode active material coated with the powder polyacrylic acid was manufactured according to a spray drying method in which a spray drier was used in Ar gas at 80° C. Next, this material was immersed in a $CaCl_2$ aqueous solution adjusted to be 30 wt %, and the polyacrylic acid coating the negative electrode active material was made into the polyacrylic acid derivative cross-linked with $Ca^{2+}$. The negative electrode for a lithium ion secondary battery and the lithium ion secondary battery were manufactured in a manner similar to those of Example 1 except that after this solution was stirred well, the solution was filtered and the residue was dried to form the negative electrode active material coated with the polyacrylic acid derivative cross-linked with 5 wt % of $Ca^{2+}$ relative to the negative electrode active material.

Example 7

In regard to a negative electrode for a lithium ion secondary battery and a lithium ion secondary battery according to Example 7, a dispersion solution was manufactured in which the negative electrode active material containing graphite and SiO obtained by the disproportionation reaction in a heat treatment of 1000° C. under the reduced pressure at a weight ratio of 1:1 was dispersed in an aqueous solution containing 6 wt % of polyacrylic acid relative to the weight of the negative electrode active material. Next, using this dispersion solution, the negative electrode active material coated with the powder polyacrylic acid was manufactured according to a spray drying method in which a spray drier was used in Ar gas at 80° C. Next, this material was immersed in a $CaCl_2$ aqueous solution adjusted to be 30 wt %, and the polyacrylic acid coating the negative electrode active material was made into the polyacrylic acid derivative cross-linked with $Ca^{2+}$. The negative electrode for a lithium ion secondary battery and the lithium ion secondary battery were manufactured in a manner similar to those of Example 1 except that after this solution was stirred well, the solution was filtered and the residue was dried to form the negative electrode active material coated with the polyacrylic acid derivative cross-linked with 7 wt % of $Ca^{2+}$ relative to the negative electrode active material.

Example 8

In regard to a negative electrode for a lithium ion secondary battery and a lithium ion secondary battery according to Example 8, a dispersion solution was manufactured in which the negative electrode active material containing graphite and SiO obtained by the disproportionation reaction in a heat treatment of 1000° C. under the reduced pressure at a weight ratio of 1:1 was dispersed in an aqueous solution containing 8 wt % of polyacrylic acid relative to the weight of the negative electrode active material. Next, using this dispersion solution, the negative electrode active material coated with the powder polyacrylic acid was manufactured according to a spray drying method in which a spray drier was used in Ar gas at 80° C. Next, this material was immersed in a $CaCl_2$ aqueous solution adjusted to be 30 wt %, and the polyacrylic acid coating the negative electrode active material was made into the polyacrylic acid derivative cross-linked with $Ca^{2+}$. The negative electrode for a lithium ion secondary battery and the lithium ion secondary battery were manufactured in a manner similar to those of Example 1 except that after this solution was stirred well, the solution was filtered and the residue was dried to form the negative electrode active material coated with the polyacrylic acid derivative cross-linked with 10 wt % of $Ca^{2+}$ relative to the negative electrode active material.

Example 9

In regard to a negative electrode for a lithium ion secondary battery and a lithium ion secondary battery according to Example 9, a dispersion solution was manufactured in which the negative electrode active material was dispersed in an aqueous solution containing 0.9 wt % of polyacrylic acid relative to the weight of the negative electrode active material. Next, using this dispersion solution, the negative electrode active material coated with the powder polyacrylic acid was manufactured according to a spray drying method in which a spray drier was used in Ar gas at 80° C. Next, this material was immersed in a $SrCl_2$ aqueous solution adjusted to be 30 wt %, and the polyacrylic acid coating the negative electrode active material was made into the polyacrylic acid derivative cross-linked with $Sr^{2+}$. The negative electrode for a lithium ion secondary battery and the lithium ion secondary battery were manufactured in a manner similar to those of Example 1 except that after this solution was stirred well, the solution was filtered and the residue was dried to form the negative electrode active material coated with the polyacrylic acid derivative cross-linked with 1.5 wt % of $Sr^{2+}$ relative to the negative electrode active material.

Example 10

In regard to a negative electrode for a lithium ion secondary battery and a lithium ion secondary battery according to Example 10, a dispersion solution was manufactured in which the negative electrode active material was dispersed in an aqueous solution containing 0.8 wt % of polyacrylic acid relative to the weight of the negative electrode active material. Next, using this dispersion solution, the negative electrode active material coated with the powder polyacrylic acid was manufactured according to a spray drying method in which a spray drier was used in Ar gas at 80° C. Next, this material was immersed in a $BaCl_2$ aqueous solution adjusted to be 30 wt %, and the polyacrylic acid coating the negative electrode active material was made into the polyacrylic acid derivative cross-linked with $Ba^{2+}$. The negative electrode for a lithium ion secondary battery and the lithium ion secondary battery were manufactured in a manner similar to those of Example 1 except that after this solution was stirred well, the solution was filtered and the residue was dried to form the negative electrode active material coated with the polyacrylic acid derivative cross-linked with 1.5 wt % of $Ba^{2+}$ relative to the negative electrode active material.

Example 11

In regard to a negative electrode for a lithium ion secondary battery and a lithium ion secondary battery according to Example 11, a dispersion solution was manufactured in which the negative electrode active material was dispersed in an aqueous solution containing 1.1 wt % of polyacrylic acid relative to the weight of the negative electrode active material. Next, using this dispersion solution, the negative electrode active material coated with the powder polyacrylic acid was manufactured according to a spray drying method in which a spray drier was used in Ar gas at 80° C. Next, this material was immersed in a $CoCl_2$ aqueous solution adjusted to be 30 wt %, and the polyacrylic acid coating the negative electrode active material was made into the polyacrylic acid derivative cross-linked with $Co^{2+}$. The negative electrode for a lithium ion secondary battery and the lithium ion secondary battery were manufactured in a manner similar to those of Example 1 except that after this solution was stirred well, the solution was filtered and the residue was dried to form the negative electrode active material coated with the polyacrylic acid derivative cross-linked with 1.5 wt % of $Co^{2+}$ relative to the negative electrode active material.

Example 12

In regard to a negative electrode for a lithium ion secondary battery and a lithium ion secondary battery according to Example 12, a dispersion solution was manufactured in which the negative electrode active material was dispersed in an aqueous solution containing 1.1 wt % of polyacrylic acid relative to the weight of the negative electrode active material. Next, using this dispersion solution, the negative electrode active material coated with the powder polyacrylic acid was manufactured according to a spray drying method in which a spray drier was used in Ar gas at 80° C. Next, this material was immersed in a NiCl$_2$ aqueous solution adjusted to be 30 wt %, and the polyacrylic acid coating the negative electrode active material was made into the polyacrylic acid derivative cross-linked with Ni$^{2+}$. The negative electrode for a lithium ion secondary battery and the lithium ion secondary battery were manufactured in a manner similar to those of Example 1 except that after this solution was stirred well, the solution was filtered and the residue was dried to form the negative electrode active material coated with the polyacrylic acid derivative cross-linked with 1.5 wt % of Ni$^{2+}$ relative to the negative electrode active material.

Example 13

In regard to a negative electrode for a lithium ion secondary battery and a lithium ion secondary battery according to Example 13, a dispersion solution was manufactured in which the negative electrode active material was dispersed in an aqueous solution containing 1.3 wt % of polyacrylic acid relative to the weight of the negative electrode active material. Next, using this dispersion solution, the negative electrode active material coated with the powder polyacrylic acid was manufactured according to a spray drying method in which a spray drier was used in Ar gas at 80° C. Next, this material was immersed in a CuCl$_2$ aqueous solution adjusted to be 30 wt %, and the polyacrylic acid coating the negative electrode active material was made into the polyacrylic acid derivative cross-linked with Cu$^{2+}$. The negative electrode for a lithium ion secondary battery and the lithium ion secondary battery were manufactured in a manner similar to those of Example 1 except that after this solution was stirred well, the solution was filtered and the residue was dried to form the negative electrode active material coated with the polyacrylic acid derivative cross-linked with 1.5 wt % of Cu$^{2+}$ relative to the negative electrode active material.

Example 14

In regard to a negative electrode for a lithium ion secondary battery and a lithium ion secondary battery according to Example 14, a dispersion solution was manufactured in which the negative electrode active material was dispersed in an aqueous solution containing 1.1 wt % of polyacrylic acid relative to the weight of the negative electrode active material. Next, using this dispersion solution, the negative electrode active material coated with the powder polyacrylic acid was manufactured according to a spray drying method in which a spray drier was used in Ar gas at 80° C. Next, this material was immersed in a ZnCl$_2$ aqueous solution adjusted to be 30 wt %, and the polyacrylic acid coating the negative electrode active material was made into the polyacrylic acid derivative cross-linked with Zn$^{2+}$. The negative electrode for a lithium ion secondary battery and the lithium ion secondary battery were manufactured in a manner similar to those of Example 1 except that after this solution was stirred well, the solution was filtered and the residue was dried to form the negative electrode active material coated with the polyacrylic acid derivative cross-linked with 1.5 wt % of Zn$^{2+}$ relative to the negative electrode active material.

Example 15

A negative electrode for a lithium ion secondary battery and a lithium ion secondary battery according to Example 15 were manufactured in a manner similar to the negative electrode for a lithium ion secondary battery and the lithium ion secondary battery according to Example 1 except that the negative electrode active material contained Si and graphite at a weight ratio of 1:1.

Example 16

A negative electrode for a lithium ion secondary battery and a lithium ion secondary battery according to Example 16 were manufactured in a manner similar to the negative electrode for a lithium ion secondary battery and the lithium ion secondary battery according to Example 5 except that the negative electrode active material contained Si and graphite at a weight ratio of 1:1.

Example 17

A negative electrode for a lithium ion secondary battery and a lithium ion secondary battery according to Example 17 were manufactured in a manner similar to the negative electrode for a lithium ion secondary battery and the lithium ion secondary battery according to Example 9 except that the negative electrode active material contained Si and graphite at a weight ratio of 1:1.

Example 18

A negative electrode for a lithium ion secondary battery and a lithium ion secondary battery according to Example 18 were manufactured in a manner similar to the negative electrode for a lithium ion secondary battery and the lithium ion secondary battery according to Example 10 except that the negative electrode active material contained Si and graphite at a weight ratio of 1:1.

Example 19

A negative electrode for a lithium ion secondary battery and a lithium ion secondary battery according to Example 19 were manufactured in a manner similar to the negative electrode for a lithium ion secondary battery and the lithium ion secondary battery according to Example 11 except that the negative electrode active material contained Si and graphite at a weight ratio of 1:1.

Example 20

A negative electrode for a lithium ion secondary battery and a lithium ion secondary battery according to Example 20 were manufactured in a manner similar to the negative electrode for a lithium ion secondary battery and the lithium ion secondary battery according to Example 12 except that the negative electrode active material contained Si and graphite at a weight ratio of 1:1.

Example 21

A negative electrode for a lithium ion secondary battery and a lithium ion secondary battery according to Example 21 were manufactured in a manner similar to the negative electrode for a lithium ion secondary battery and the lithium ion secondary battery according to Example 13 except that the negative electrode active material contained Si and graphite at a weight ratio of 1:1.

Example 22

A negative electrode for a lithium ion secondary battery and a lithium ion secondary battery according to Example 22 were manufactured in a manner similar to the negative electrode for a lithium ion secondary battery and the lithium ion secondary battery according to Example 14 except that the negative electrode active material contained Si and graphite at a weight ratio of 1:1.

Comparative Example 1

A negative electrode for a lithium ion secondary battery and a lithium ion secondary battery according to Comparative Example 1 were manufactured in a manner similar to the negative electrode for a lithium ion secondary battery and the lithium ion secondary battery according to Example 1 except that the negative electrode active material not coated with the polymer compound was used.

Comparative Example 2

In regard to a negative electrode for a lithium ion secondary battery and a lithium ion secondary battery according to Comparative Example 2, a dispersion solution was manufactured in which the negative electrode active material containing graphite and SiO obtained by the disproportionation reaction in a heat treatment of 1000° C. under the reduced pressure at a weight ratio of 1:1 was dispersed in an aqueous solution containing 1.5 wt % of polyacrylic acid relative to the weight of the negative electrode active material. Next, using this dispersion solution, the negative electrode active material coated with the polyacrylic acid was manufactured by spray drying, and this active material was mixed in ethylene glycol and stirred for one hour at 120° C. Thus, the polyacrylic acid coating the negative electrode active material was made into the polyacrylic acid derivative cross-linked with —$C_2H_4$—. The negative electrode for a lithium ion secondary battery and the lithium ion secondary battery were manufactured in a manner similar to those of Example 1 except that after this solution was stirred well, the solution was filtered and the residue was dried to form the negative electrode active material coated with the polyacrylic acid derivative cross-linked with 5 wt % of —$CH_2$— relative to the negative electrode active material.

Comparative Example 3

In regard to a negative electrode for a lithium ion secondary battery and a lithium ion secondary battery according to Comparative Example 3, a dispersion solution was manufactured in which the negative electrode active material containing graphite and SiO obtained by the disproportionation reaction in a heat treatment of 1000° C. under the reduced pressure at a weight ratio of 1:1 was dispersed in an aqueous solution containing 1.5 wt % of polyacrylic acid relative to the weight of the negative electrode active material. Next, using this dispersion solution, the negative electrode active material coated with the polyacrylic acid was manufactured by spray drying, and this active material was mixed in 1,3-butanediol and stirred for one hour at 120° C. Thus, the polyacrylic acid coating the negative electrode active material was made into the polyacrylic acid derivative cross-linked with —$C_4H_8$—. The negative electrode for a lithium ion secondary battery and the lithium ion secondary battery were manufactured in a manner similar to those of Example 1 except that after this solution was stirred well, the solution was filtered and the residue was dried to form the negative electrode active material coated with the polyacrylic acid derivative cross-linked with 5 wt % of —$C_4H_8$— relative to the negative electrode active material.

Comparative Example 4

A negative electrode for a lithium ion secondary battery and a lithium ion secondary battery according to Comparative Example 4 were manufactured in a manner similar to the negative electrode for a lithium ion secondary battery and the lithium ion secondary battery according to Comparative Example 2 except that the negative electrode contained Si and graphite at a weight ratio of 1:1.

Comparative Example 5

A negative electrode for a lithium ion secondary battery and a lithium ion secondary battery according to Comparative Example 5 were manufactured in a manner similar to the negative electrode for a lithium ion secondary battery and the lithium ion secondary battery according to Comparative Example 3 except that the negative electrode contained Si and graphite at a weight ratio of 1:1.

<Evaluation>

With the use of the dark-field scanning transmission electron microscopy (ADF-STEM), ten portions of the surface and the section of the negative electrode for a lithium ion secondary battery manufactured according to each of Examples 1 to 22 and Comparative Examples 1 to 5 were observed to check the state of coating the negative electrode active material for a lithium ion secondary battery with the polymer compound film.

Moreover, with the use of the energy dispersive X-ray spectroscopy (EDS-STEM), the element mapping of the divalent metal cation was conducted.

Note that it is defined that the negative electrode active material is entirely coated as long as all the materials observed here are coated with the polymer film.

Moreover, the surface and the section of the negative electrode active material for a lithium ion secondary battery and the negative electrode for a lithium ion secondary battery manufactured according to each of Examples 1 to 22 and Comparative Examples 1 to 5 were measured by the laser Raman spectrometry.

Moreover, the negative electrode active material for a lithium ion secondary battery manufactured according to each of Examples 1 to 22 and Comparative Examples 1 to 5 was subjected to the thermal gravimetric analysis/differential thermal analysis (TG-DTA) to measure the content of the polymer compound based on the weight change.

In regard to the negative electrode for a lithium ion secondary battery and the lithium ion secondary battery manufactured according to each of Examples 1 to 22 and Comparative Examples 1 to 5, the number of cycles when the capacity retention reaches 70% and whether the gas is generated or not in the charging/discharging cycle at 60° C. and 80° C. were evaluated.

(Coating State of Polymer Compound Film)

With the use of the dark-field scanning transmission electron microscopy, ten portions of the negative electrode active material for a lithium ion secondary battery manufactured according to each of Examples and Comparative Examples were observed to check the state of the coating of the polymer compound film. It has been confirmed that the ten portions of the surface of the negative electrode active material for a lithium ion secondary battery were entirely coated with the polymer film without the exposure of the negative electrode active material. Moreover, it has been confirmed that the polymer compound film has unevenness.

As a result of the element mapping by EDS-STEM, it has been confirmed that the divalent metal cation elements are uniformly distributed in the polymer film coating the negative electrode active material.

Moreover, the surface and the section of the negative electrode active material for a lithium ion secondary battery and the negative electrode for a lithium ion secondary battery manufactured according to each of Examples 1 to 22 and Comparative Examples 1 to 5 were measured by the microscopic Raman spectrometry. It has confirmed that the obtained Raman peak derived from the carboxyl group of the polyacrylic acid is chemically shifted.

From the ADF-STEM, EDS-STEM, and the laser Raman spectrometry, it has been confirmed that the polymer film on the surface of the negative electrode active material for a lithium ion secondary battery manufactured according to each of Examples and Comparative Examples is the polyacrylic acid derivative cross-linked with the divalent metal cation and the negative electrode active material is entirely coated.

Table 1 represents the amount of coating of the polymer compound that has been confirmed from the result of measuring the weight change through TG-DTA.
(High-Temperature Charging/Discharging Cycle Test)

After the lithium ion secondary battery manufactured according to each of Examples and Comparative Examples was charged and discharged repeatedly under the charging/discharging test condition as below, the high-temperature charging/discharging cycle characteristic thereof was evaluated. The charging/discharging was conducted at 60° C. or 80° C. In the charging/discharging test condition, constant-current charging was conducted at a constant current of 1.0 C until 4.2 V and then the discharging was conducted at a constant current of 1.0 C until the battery voltage became 2.5 V; this is regarded as one cycle. The number of charging/discharging cycles when the discharge capacity retention after the charging/discharging cycle has become less than 70% was defined as the high-temperature cycle lifetime and evaluated. Note that 1 C is the current value at which the charging/discharging ends in just an hour when the battery cell with capacity of a nominal capacity value is charged at constant current or discharged at constant current.

In the lithium ion secondary battery manufactured according to each of Examples and Comparative Examples, whether the gas was generated or not was determined from the expansion of the lithium ion secondary battery under 50 kPa after the charging/discharging cycle was conducted 100 times and the pressure was reduced.

In regard to the negative electrode for a lithium ion secondary battery and the lithium ion secondary battery according to the present invention, the results of the high-temperature cycle lifetime and whether the gas was generated or not in each of Examples 1 to 22 and Comparative Examples 1 to 5 are shown in Table 1. The divalent metal cation used for cross-linking in Table 1 is expressed as "cross-linking portion".

TABLE 1

|  | Cross-link Portion | negative electrode active material | coating amount/ weight % | high-temperature cycle lifetime (60° C.) | high-temperature cycle lifetime (80° C.) | whether the gas was generated or not (60° C.) After 100 cycles |
|---|---|---|---|---|---|---|
| Example 1 | Mg | graphite/SiO (1:1) | 1.5 | 311 | 303 | No |
| Example 2 | Ca | graphite/SiO (1:1) | 0.05 | 101 | 87 | No |
| Example 3 | Ca | graphite/SiO (1:1) | 0.08 | 134 | 101 | No |
| Example 4 | Ca | graphite/SiO (1:1) | 0.1 | 208 | 175 | No |
| Example 5 | Ca | graphite/SiO (1:1) | 1.5 | 316 | 304 | No |
| Example 6 | Ca | graphite/SiO (1:1) | 5 | 323 | 306 | No |
| Example 7 | Ca | graphite/SiO (1:1) | 7 | 155 | 131 | No |
| Example 8 | Ca | graphite/SiO (1:1) | 10 | 103 | 85 | No |
| Example 9 | Sr | graphite/SiO (1:1) | 1.5 | 265 | 233 | No |
| Example 10 | Ba | graphite/SiO (1:1) | 1.5 | 255 | 212 | No |
| Example 11 | Co | graphite/SiO (1:1) | 1.5 | 256 | 229 | No |
| Example 12 | Ni | graphite/SiO (1:1) | 1.5 | 247 | 225 | No |
| Example 13 | Cu | graphite/SiO (1:1) | 1.5 | 250 | 227 | No |
| Example 14 | Zn | graphite/SiO (1:1) | 1.5 | 233 | 227 | No |
| Example 15 | Mg | graphite/Si (1:1) | 1.5 | 221 | 210 | No |
| Example 16 | Ca | graphite/Si (1:1) | 1.5 | 233 | 216 | No |
| Example 17 | Sr | graphite/Si (1:1) | 1.5 | 201 | 170 | No |
| Example 18 | Ba | graphite/Si (1:1) | 1.5 | 196 | 165 | No |
| Example 19 | Co | graphite/Si (1:1) | 1.5 | 197 | 169 | No |
| Example 20 | Ni | graphite/Si (1:1) | 1.5 | 197 | 165 | No |
| Example 21 | Cu | graphite/Si (1:1) | 1.5 | 195 | 164 | No |
| Example 22 | Zn | graphite/Si (1:1) | 1.5 | 195 | 165 | No |
| Comparative Example 1 | — | graphite/SiO (1:1) | — | 30 | 11 | Yes |
| Comparative Example 2 | —C2H4— | graphite/SiO (1:1) | 1.5 | 78 | 42 | Yes |
| Comparative Example 3 | —C4H8— | graphite/SiO (1:1) | 1.5 | 71 | 38 | Yes |
| Comparative Example 4 | —C2H4— | graphite/Si (1:1) | 1.5 | 65 | 29 | Yes |
| Comparative Example 5 | —C4H8— | graphite/Si (1:1) | 1.5 | 62 | 28 | Yes |

As is clear from Table 1, the use of the negative electrode active material coated with the polyacrylic acid cross-linked with the divalent metal cation improves the high-temperature cycle characteristic drastically. As is clear from whether the gas is generated or not, it has been determined that the use of the negative electrode active material coated with the polyacrylic acid cross-linked with the divalent metal cation suppresses the side reaction between the electrolyte and the negative electrode active material.

It has been confirmed that the coating amount of the polymer compound in the negative electrode for a lithium ion secondary battery is controlled within the arbitrary amount.

Moreover, in regard to the negative electrode for a lithium ion secondary battery and the lithium ion secondary battery manufactured according to each of Examples and Comparative Examples, the discharge capacity retention after 100 cycles at 60° C. and 80° C. was evaluated.

The discharge capacity retention after 100 cycles is defined by the calculation formula below, for example.

Discharge capacity retention after 100 cycles(%)= (discharge capacity after 100 cycles/discharge capacity after 1 cycle)×100(%).

Table 2 expresses the discharge capacity retention after 300 cycles at 60° C. in regard to the negative electrode for the lithium ion secondary battery and the lithium ion secondary battery according to each of Examples 2 to 8 and Comparative Example 1 in the present invention.

As is clear from Table 2, the use of the negative electrode active material for a lithium ion secondary battery explicitly improves the high-temperature cycle characteristic and the best range of the coating amount is 0.1 to 5 wt %. It is considered that since this is the necessary and sufficient coating amount for suppressing the reaction between the negative electrode active material and the electrolyte, the high-temperature cycle characteristic can be improved.

Moreover, Table 2 expresses the capacity retention after the high-temperature cycle of the negative electrode active material for a lithium ion secondary battery according to each of Examples 2 to 8 and Comparative Example 1, the state of the negative electrode after 300 high-temperature cycles, and the minimum and maximum film thicknesses of the polymer compound when the coating state of ten portions of the polymer compound film is observed with the dark-field scanning transmission electron microscopy.

TABLE 2

| | the capacity retention after 300 high-temperature cycles | the state of the negative electrode after the 300 high-temperature cycles | minimum film thickness/ nm | maximum film thickness/ nm |
|---|---|---|---|---|
| Example 2 | 41% | change | 1 | 17 |
| Example 3 | 45% | change | 1 | 18 |
| Example 4 | 71% | a little chage | 3 | 24 |
| Example 5 | 91% | no change | 10 | 156 |
| Example 6 | 89% | no change | 15 | 500 |
| Example 7 | 50% | no change | 36 | 651 |
| Example 8 | 36% | no change | 65 | 813 |
| Comparative Example 1 | 6% | change | 0 | 0 |

In Examples 2 to 8, it has been confirmed that the thickness varies between the minimum and maximum film thicknesses in Table 2.

Moreover, as a result of the element mapping of the polymer compound of the negative electrode active material for a lithium ion secondary battery manufactured in each of Examples 2 to 8 through EDS-STEM, it has been confirmed that the divalent metal cation elements are uniformly distributed in the polymer film coating the negative electrode active material.

As is clear from Table 2, when the minimum film thickness of the polymer compound is 10 nm and the maximum film thickness is 500 nm, the capacity retention after 300 high-temperature cycles is excellent. Moreover, it has been clarified that the state of the negative electrode after the 300 high-temperature cycles remains the same as long as the minimum film thickness is 10 nm. In other words, as long as the minimum film thickness is 10 nm, the effect of relieving the stress in the negative electrode active material layer that is generated from the expansion of the negative electrode active material during the charging is increased, and moreover the high-temperature cycle characteristic is improved.

The change in state of the negative electrode after the 300 high-temperature cycles illustrated in Table 2 refers to the crease or disconnection of the electrode.

The invention claimed is:

1. A negative electrode active material for a lithium ion secondary battery, wherein:
    a surface of silicon or silicon oxide included in a negative electrode active material is coated with a polymer compound; and
    the polymer compound is a polyacrylic acid derivative whose carboxyl groups at ends of side chains are cross-linked with a divalent metal cation, having the following structural formula as at least a part thereof:

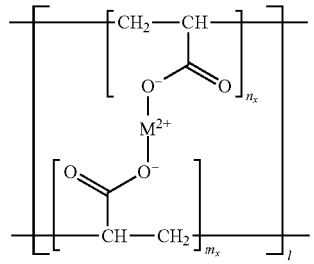

wherein M represents the divalent metal cation and $n_x$, $m_x$ (x is a positive integer), and $l$ express the polymerization degree.

2. The negative electrode active material for a lithium ion secondary battery according to claim 1, wherein one or more is selected from $Mg^{2+}$, $Ca^{2+}$, $Sr^{2+}$, $Ba^{2+}$, $Co^{2+}$, $Ni^{2+}$, $Cu^{2+}$, and $Zn^{2+}$ as the divalent metal cation.

3. The negative electrode active material for a lithium ion secondary battery according to claim 1, wherein the divalent metal cation is $Mg^{2+}$ or $Ca^{2+}$.

4. The negative electrode active material for a lithium ion secondary battery according to claim 1, wherein the polymer compound is contained by 0.1 to 5 wt % relative to the negative electrode active material.

5. The negative electrode active material for a lithium ion secondary battery according to claim 1, wherein the polymer compound has a coating thickness of 10 to 500 nm.

6. A negative electrode for a lithium ion secondary battery, comprising the negative electrode active material for a lithium ion secondary battery according to claim 1.

7. A lithium ion secondary battery comprising the negative electrode for a lithium ion secondary battery according to claim 6.

8. The negative electrode active material for a lithium ion secondary battery according to claim 1, wherein the polymer compound has a weight-average molecular weight of 200,000 or more.

9. The negative electrode active material for a lithium ion secondary battery according to claim 1, wherein the surface is of silicon.

10. The negative electrode active material for a lithium ion secondary battery according to claim 1, wherein the surface is of silicon oxide.

11. The lithium ion secondary battery according to claim 7, wherein a positive electrode thereof comprises a positive electrode active material comprises a lithium composite oxide.

* * * * *